(12) United States Patent
Dzung et al.

(10) Patent No.: US 12,455,293 B2
(45) Date of Patent: Oct. 28, 2025

(54) ITERATIVE LIQUID ASPIRATION

(71) Applicant: TECAN TRADING AG, Männedorf (CH)

(72) Inventors: Matthias Dzung, Erlenbach (CH); Patrick Kinney, Hayward, CA (US); Philipp Ott, Steg (CH); Carsten Hase, Zürich (CH); Andreas Schenk, Fürstenbrunn (AT); David Papencordt, Hallein (AT); Philipp Riedel, Zürich (CH); Thomas Geiges, Männedorf (CH)

(73) Assignee: TECAN TRADING AG, Männedorf (CH)

( * ) Notice: Subject to any disclaimer, the term of this patent is extended or adjusted under 35 U.S.C. 154(b) by 919 days.

(21) Appl. No.: 17/554,221

(22) Filed: Dec. 17, 2021

(65) Prior Publication Data

US 2022/0196696 A1 Jun. 23, 2022

(30) Foreign Application Priority Data

Dec. 21, 2020 (EP) .................................. 20 216 046

(51) Int. Cl.
*G01N 35/00* (2006.01)
*G01N 35/10* (2006.01)

(52) U.S. Cl.
CPC ..... *G01N 35/1074* (2013.01); *G01N 35/1011* (2013.01); *G01N 35/1016* (2013.01); *G01N 2035/1025* (2013.01)

(58) Field of Classification Search
None
See application file for complete search history.

(56) References Cited

U.S. PATENT DOCUMENTS

| | | |
|---|---|---|
| 3,897,343 A | 7/1975 | Ayres |
| 4,696,748 A | 9/1987 | Nitadori et al. |

(Continued)

FOREIGN PATENT DOCUMENTS

| | | |
|---|---|---|
| CH | 682847 A5 | 11/1993 |
| CN | 107917835 A | 4/2018 |

(Continued)

*Primary Examiner* — Brian R Gordon
(74) *Attorney, Agent, or Firm* — MH2 Technology Law Group LLP (57) ABSTRACT

A method for aspirating a first liquid medium of two liquid media of different density from a sample container comprises: lowering a pipette of the laboratory automation device into the sample container until a pipette tip of the pipette has passed a lowering distance from the surface of the first liquid medium in the sample container, wherein the lowering distance is chosen, such that the pipette tip passes at least an aspiration volume in the sample container; aspirating liquid from the sample container during the lowering of the pipette by generating an underpressure in the pipette, wherein the first liquid medium is aspirated, and after the interface and the pipette tip pass each other, the second liquid medium of the two liquid media is aspirated; measuring a pressure in the pipette during the lowering of the pipette and detecting a position of the interface, when a slope of the pressure changes; when the lowering distance has been passed and no interface is detected, aspirating the aspiration volume from the first liquid medium and dispensing the aspiration volume of the first liquid medium into a further sample container.

12 Claims, 5 Drawing Sheets

(56) References Cited

U.S. PATENT DOCUMENTS

| | | | |
|---|---|---|---|
| 5,463,895 A | 11/1995 | Brentz | |
| 5,512,247 A | 4/1996 | Bonacina et al. | |
| 5,529,754 A | 6/1996 | Bonacina et al. | |
| 5,612,227 A | 3/1997 | Inoue et al. | |
| 5,665,601 A * | 9/1997 | Kilmer | G01N 35/1009 422/106 |
| 5,750,881 A * | 5/1998 | Dorenkott | G01F 11/021 73/864.11 |
| 5,753,512 A * | 5/1998 | Riall | G01N 35/04 422/549 |
| 6,158,269 A * | 12/2000 | Dorenkott | G01N 1/38 422/562 |
| 6,938,504 B2 | 9/2005 | Camenisch | |
| 2004/0050861 A1* | 3/2004 | Lisec | G01N 35/10 222/333 |
| 2007/0020763 A1* | 1/2007 | Ingenhoven | B01L 3/021 436/43 |
| 2007/0026534 A1* | 2/2007 | Graham | G01F 11/021 436/180 |
| 2007/0241130 A1* | 10/2007 | Curtis | B01L 3/0227 73/863.02 |
| 2009/0060785 A1* | 3/2009 | Shimane | G01N 35/1011 422/67 |
| 2009/0211380 A1* | 8/2009 | Tajima | G01N 35/1016 73/864.11 |
| 2010/0210007 A1* | 8/2010 | Iwamura | G01N 35/1011 435/286.2 |
| 2012/0003731 A1 | 1/2012 | Kuroda | |
| 2012/0156800 A1* | 6/2012 | Aoki | G01N 21/553 436/180 |
| 2013/0045498 A1* | 2/2013 | Abel | G01N 11/04 435/23 |
| 2013/0280143 A1* | 10/2013 | Zucchelli | B25J 9/1697 422/501 |
| 2016/0047835 A1* | 2/2016 | Pingel | G01N 35/0099 73/864.25 |
| 2016/0303556 A1* | 10/2016 | Kopp | B01L 3/0217 |
| 2017/0138976 A1* | 5/2017 | Pawlowski | G01N 35/1016 |
| 2017/0307481 A1* | 10/2017 | Tai | G01F 25/0092 |
| 2018/0238923 A1* | 8/2018 | Abe | B25J 9/1679 |
| 2019/0091679 A1* | 3/2019 | Noda | G01N 35/10 |
| 2019/0143317 A1* | 5/2019 | Ott | G01N 35/00732 422/518 |
| 2019/0193075 A1* | 6/2019 | Fuhr | G01K 3/04 |
| 2019/0265264 A1* | 8/2019 | Yamato | G01N 35/0092 |
| 2020/0330976 A1* | 10/2020 | Wikholm | B01L 3/0275 |
| 2021/0008544 A1* | 1/2021 | Tamai | G01N 35/1011 |
| 2025/0170568 A1* | 5/2025 | White | B01L 3/0279 |

FOREIGN PATENT DOCUMENTS

| | | |
|---|---|---|
| CN | 207751770 U | 8/2018 |
| DE | 10148608 A1 | 9/2002 |
| EP | 2485049 A2 | 8/2012 |
| JP | 2010048594 A | 3/2010 |
| WO | 2019/060716 A1 | 3/2019 |

* cited by examiner

ITERATIVE LIQUID ASPIRATION

CROSS-REFERENCE TO RELATED APPLICATIONS

The present application claims the benefit of priority of European Patent Application No. 20216046.1, filed on Dec. 21, 2020, the disclosure of which is incorporated by reference herein in its entirety.

FIELD OF THE INVENTION

The invention relates to a method, a computer program and a computer-readable medium for aspirating a first liquid medium of two liquid media of different density from a sample container. Furthermore, the method relates to a laboratory automation device.

BACKGROUND OF THE INVENTION

Laboratory automation devices are used for automating tasks of a laboratory assistant, which, for example, tests a patient for specific diseases. Usually, a sample of the patient's blood, urine, stool, etc. is taken and analyzed by means of a bio-chemical procedure. Such a procedure consists in various operations like adding substances, incubating, separating, etc. and a measurement process which quantitatively or qualitatively measures the amount or presence of a substance indicating the specific disease.

In specific procedure it is necessary to separate two different liquid media of different density. Such liquid media usually separate themselves, for example due to gravity or a centrifuge, in different layers in a sample container. In this case, the interface between the two liquid media has to be detected and the laboratory automation devices then can aspirate one of the liquid media with a pipette.

For example, in prenatal studies and cancer studies, diagnostic methods aim to extract circulating tumor cells and cell-free DNA from blood plasma/serum of centrifuged blood samples. For this application, the extracted serum should not be contaminated with red blood cells (i.e. erythrocytes) and white blood cells.

For determining the interface between blood plasma and erythrocytes, there are laser-based measurements in the NIR (Near Infrared) range of the spectrum, which determine the interface with light. However, non-transparent sample containers may cause problems. Other systems are based on imaging in the visible range of the spectrum. However, specific illumination is required and sample containers provided with stickers may cause problems.

U.S. Pat. No. 3,897,343 A relates to a blood collection and separator assembly of the type suitable for centrifuging to separate the plasma from the cellular phase of blood is disclosed. A piston that has a density which is in-between plasma and erythrocytes is used for separating plasma and erythrocytes.

U.S. Pat. No. 4,696,748 A uses a porous filter to separate the blood.

CN 207 751 770 U and CN 107 917 835 A describe a method for separation of blood plasma with a separating device.

US 2012/003731 A1) describes a method for determining an interface between blood plasma and blood cells. A pipette is lowered in a sample container and the interface is detected based on pressure changes in the pipette.

CH 682 847 A5, U.S. Pat. Nos. 5,463,895, 5,512,247 and 5,529,754 all relate to pipetting devices and pipetting methods performed therewith. They all describe that a pipette tip should only immersed for a very short distance into the liquid medium to be aspirated, since the amount of sample entrained at the outer surface of the pipette tip should be as small as possible.

SUMMARY OF THE INVENTION

When determining an interface between a first and a second liquid media based on pressure analysis within a pipette, there may be the problem that the interface is only detected after some of the second liquid media already has reached the interior of the pipette. This may be aggravated by a laminar flow of second liquid media within the first liquid media in the pipette tip. However, sometimes it is desired that no second liquid media is aspirated at all.

It is an objective of the invention to provide a simple, reliable and exact method for aspirating a first liquid medium of two liquid media of different density from a sample container, wherein the interface between the two liquid media is detected by pressure measurements in the pipette. The method may be adapted to more than two different liquid media.

This objective is achieved by the subject-matter of the independent claims. Further exemplary embodiments are evident from the dependent claims and the following description.

A first aspect of the invention relates to a method for aspirating a first liquid medium of the two liquid media of different density from the sample container.

The method may be performed automatically by a laboratory automation device and in particular a controller of the laboratory automation device. A controller of a laboratory automation device adapted for performing the method also is a further aspect of the invention.

A liquid medium may be a fluid which is nearly uncompressible. A liquid medium may be a liquid and/or paste-like substance. At least, a liquid medium is adapted for being aspirated by a pipette of the laboratory automation device. Examples for liquid media are aqueous solutions, organic solvents, oil solutions, blood plasma, separated blood cells, precipitated proteins, gels, slurries of particles, etc. In particular, the method may be used for separating blood plasma from centrifuged blood cells and for liquid-liquid extraction.

According to an embodiment of the invention, the method comprises: lowering a pipette of the laboratory automation device into the sample container until a pipette tip of the pipette has passed a lowering distance from the surface of the first liquid medium in the sample container, wherein the lowering distance is chosen, such that the pipette tip passes at least an aspiration volume in the sample container; aspirating liquid from the sample container during the lowering of the pipette by generating an underpressure in the pipette. The first liquid medium is aspirated before the interface and the pipette tip pass each other. The second liquid media is aspirated, after the interface and the pipette tip pass each other. The sample container may be a sample tube or a well of a microplate, for example according to ANSI (American National Standards Institute)/SLAS Microplate Standards 1 to 4-2004.

The interface between the two liquid media may be a phase border and/or a layer between the two liquid media. Geometrically seen, the interface may be a substantially planar area between the two volumes of the two liquid media.

Aspirating may be performed by applying an underpressure to the interior of the pipette. For this, a pump, such as a plunger or in general negative pressure source, may be used, which is connected to the pipette.

The aspiration volume may be a maximal volume that can be aspirated by the pipette, i.e. until the pipette is completely filled. The aspiration volume of the pipette may be the volume up to which the pipette is designed to be filled. The aspiration volume also may be a volume smaller than the maximal volume of the pipette. For example, when, as described below, the first liquid media is iteratively removed from the sample container, the amount of first liquid media, which has to be discarded, since it may be decontaminated with the second liquid media due to the interface detection, may be reduced by reducing the aspiration volume.

The lowering distance from the surface of the first liquid medium, which corresponds to at least the aspiration volume may be calculated from a known horizontal area of the sample container. The lowering distance may be the aspiration volume divided by the horizontal area, wherein after that an offset may be added to the lowering distance, such that a volume of first liquid medium may stay above the pipette tip, when the aspiration volume has been aspirated from the sample container. The method further comprises: measuring a pressure in the pipette during the lowering of the pipette and detecting a position of the interface, when a slope of the pressure changes.

When the pipette tip passes the interface, the type of liquid media changes and therefore also the viscosity. This results in a change of the pressure slope of the pressure of an air cushion inside the pipette and/or inside the hose. In particular, when the pump or a similar device pumps with a constant volume rate, i.e. the amount of fluid removed or added from a volume, to which the pipette is connected, is removed or added with a constant rate, the pressure has a constant slope, when the viscosity of the aspirated liquid media is the same. When the viscosity changes, the pressure slope also changes, which can be measured with a pressure sensor connected to a volume to which the pipette and the pressure device are connected. This is also the case, when a liquid from the pipette tip is dispensed into two liquids of different viscosity. Also in this case, the pressure slope in the pipette changes.

From the pressure signal over time, the slope of the pressure signal over time can be determined and therefrom a point of a slope change can be determined. The position of the interface then can be determined as the position of the pipette tip, where the slope change has happened.

The method further comprises: when the lowering distance has been passed and no interface is detected, aspirating the aspiration volume from the first liquid medium and dispensing the aspiration volume of the first liquid medium into a further sample container. The pipette tip may be stopped, when the lowering distance has been passed. The pipette tip is moved to a level and/or position in the sample container, where the aspiration volume can be aspirated from the sample container, without the necessity of lowering the pipette further into the sample container. This deviates from the usual aspirating procedure, where aspiration is done during a continuous and slow lowering of the pipette into the sample container compared to the liquid level speed. It may be that the pipette has been completely filled with the first liquid medium, before the interface has been detected. In this case, the first liquid medium in the pipette may be dispensed into a further sampling container As the measurement of the interface is done by aspirating the first liquid media during the lowering of the pipette, it may be that solely a rest of the aspiration volume is aspirated, when the lowering distance has been passed and/or when the movement of the pipette is stopped. Into the lowering distance corresponding to the aspiration volume, also the amount of first liquid media, which is aspirated during the lowering may be taken into account.

In general, the aspiration volume may be aspirated during the lowering of the pipette tip for the lowering distance, where a first part of the aspiration volume is aspirated, and when the lowering distance has been passed, where a second, remaining part of the aspiration volume is aspirated.

According to an embodiment of the invention, the method further comprises: when the aspiration volume of the first liquid medium has been disposed into the further sample container, repeating of: optionally returning to the source container, lowering of the pipette for the lowering distance corresponding to the aspiration volume, detection of the interface and, when no interface is detected, aspirating the aspiration volume (and in particular the remaining part of the aspiration volume). The process of aspirating the aspiration volume and dispensing it into the further sample container, when it has not been possibly contaminated due to the interface detection, may be repeated until the interface is detected.

Since the method may be used for separating the first liquid medium from the second one, this may be repeated and/or iterated several times and most of the first liquid medium may be transported from the first sample container to the second sample container. It may be that the method steps of filling the pipette up to the aspiration volume, dispensing the first liquid medium and returning with the pipette tip into the sample container may be repeated several times, if the interface is not detected during the filling. The aspiration volume for each repetition need not be constant. For example, it may be constant for a fixed number of repetitions (such as three repetitions) and then reduced to one half.

On the other hand, when the interface has been detected, the content of the pipette may be discarded. This may be the complete content of the pipette, or only a fraction of it.

According to an embodiment of the invention, the method further comprises: when the lowering distance has been passed and no interface is detected, withdrawing the pipette for a safety distance before aspirating the remaining aspiration volume. It may be that the pipette tip is retreated for a safety distance to ensure that no second liquid media is aspirated, when aspiration is done without interface detection. During the aforementioned step of pipette tip retraction, the aspiration may be stopped or continued.

According to an embodiment of the invention, the method further comprises: when the lowering distance has been passed and no interface is detected, stopping the pipette before the remaining aspiration volume is aspirated. The remaining part of the aspiration volume may be aspirated without moving the pipette.

According to an embodiment of the invention, a first aspiration rate during the lowering of the pipette for the lowering distance is lower than a second aspiration rate, after the lowering distance has been passed. The first aspiration rate may be adjusted for interface detection. This may be done with a lower aspiration rate as during pure aspiration without pipette movement and/or interface detection. The amount of liquid media, which is aspirated during the measurement process may be (in particular much) smaller than the amount, which is aspirated, when the lowering distance has been passed and/or when the pipette tip is stopped.

As already mentioned, the pipette tip is lowered in the sample container along a path intersecting the interface. For example, the pipette may be moved with a pipetting arm of the laboratory automation device, which may comprise one or more motors for moving the pipette and in particular its tip in several dimensions. The pipette may be moved in a z-direction, i.e. a vertical direction and optionally in x- and y-direction. A path intersecting the interface may be defined by moving the pipette tip along a, for example straight, line through the sample container, where the interface is expected. For example, the path may start at the top of the sample container and/or an air/liquid interface in the container and may extend towards the bottom of the container.

According to an embodiment of the invention, the pipette tip is moved along a vertical direction. The vertical direction may be defined as a direction orthogonal to a plane of the interface. This plane may adjust itself orthogonal to a direction of gravity. It may be that the movement of the pipette tip has components different from the vertical direction. For example, the pipette tip may be moved along a path inclined with respect to the vertical direction.

As already mentioned, the movement may be from top to bottom of the sample container. Aspiration and/or the lowering distance may start, when an air-liquid-interface is detected. This may be done with the measurement of the change in capacitance between air and the liquid measurement, for example.

It may be that the pipette tip is moved and that the container rests at the same position. It also may be that the container is moved, while the pipette tip stays at the same position. When the container is moved towards the pipette, this also may be seen as lowering the pipette.

According to an embodiment of the invention, an aspiration rate of the aspirated liquid medium is adjusted, such that a movement speed of a liquid level in the sample container is slower than a movement speed of the pipette tip. This may prevent that more liquid media is aspirated as is present in the sample container above the pipette tip. The aspiration rate can be adjusted by adjusting the volume rate of the pressure device. The movement speed of the pipette tip may be the movement speed of the pipette tip along the vertical direction.

According to an embodiment of the invention, the movement speed of the pipette is at least 10% faster, in particular 2 to 5 times faster (or more) than the movement speed of the liquid level. With a large movement speed of the pipette during interface detection, i.e. before the pipette is stopped, it may be circumvented that under special circumstances (like a laminar flow in the pipette tip) a large quantity of second liquid medium enters the pipette and the second medium is still not detected.

According to an embodiment of the invention, the pipette tip is solely moved, when a pressure device generating the underpressure or the overpressure operates at a constant volume rate. As already described above, this results in a constant pressure slope, when the viscosity of the aspirated liquid medium is the same. For example, firstly the pressure device may be started and after a time interval, for example when the system has stabilized, the movement of the pipette is started. Analogously, firstly the movement of the pipette may be stopped and after a time interval, the pressure device may be stopped.

According to an embodiment of the invention, the pressure device comprises a plunger and the pipette is solely moved, when the plunger is moved with constant speed. With such a pump, a constant volume rate may be achieved in a rather simple way.

According to an embodiment of the invention, the liquid medium is aspirated by opening a valve between the hose and a vacuum and/or pressure reservoir for a predetermined opening time. The pressure device may comprise a valve and a reservoir containing overpressure and/or underpressure. With such an aspirating technology, a constant volume rate may be achieved in a rather simple way if the vacuum source provides a constant vacuum over the aspirating time.

According to an embodiment of the invention, the method further comprises: after detection of the interface, withdrawing the pipette from the sample container and discarding an amount of liquid from the pipette such that an aspirated amount of second liquid medium is discarded. It also may be that additionally a small quantity of the first liquid medium is discarded afterwards. Since the interface is detected after the second liquid medium has entered the pipette, it may be necessary to remove the second liquid medium from the pipette. The aspirated amount of second liquid medium may be dispensed in a waste container or the whole aspirated volume comprising the first and the second liquid may be discharged in a waste container. Dispensing in general may be performed by generating an overpressure in the pipette. The first liquid medium remaining in the pipette may be dispensed into the further sample container.

According to an embodiment of the invention, the method further comprises: after detection of the interface, stopping the pipette tip at the detected position and generating overpressure to dispense an amount of second aspirated liquid medium and optionally an amount of the first aspirated liquid medium from the pipette. In such a way, the amount of second aspirated liquid medium may be returned into the volume of the second liquid medium inside the sample container. Furthermore, when additionally an amount of the first aspirated liquid medium is dispensed it is unsecured that surly solely the first aspirated liquid medium is contained in the pipette. After that, the pipette may be removed from the sample container containing solely the first liquid medium. The first liquid medium remaining in the pipette may be dispensed into the further sample container.

It also may be that after the interface is detected, the pipette tip is moved up for a specific (in particular small) distance and that then a (in particular small) quantity of the liquid medium there is aspirated, to be sure that nothing of the other, second liquid medium leaks when the pipette is retreated from the sample container.

According to an embodiment of the invention, the method further comprises: lowering the pipette tip in the sample container to a level in the container at which the pipette was at an end of a previous detection movement, in which interface detection has been performed, and continuing detecting the position of the interface. In such a way, the pipette tip may be returned to a level in the container, where the first liquid medium really is. In this context, the term "level" may refer to a position in the sample container on the same height as the pipette on the path through the sample container. As in the first cycle, also in this cycle an air-liquid interface may be detected, when the pipette is lowered into the sample container, for example with a capacitive method. Detecting the air-liquid interface in every cycle may result in lower tolerances for finding the level in the container at which the pipette was at an end of a previous detection movement of a pervious cycle.

According to an embodiment of the invention, the method further comprises: after the aspiration volume of the first liquid medium has been dispensed into the further sample container, lowering the pipette tip in the sample container to a level at which the pipette tip was at an end of a previous detection movement, in which interface detection has been performed, and from this level continuing lowering the pipette into the sample container until the pipette tip has passed the distance from the surface of the first liquid medium corresponding to the aspiration volume detecting the position of the interface. In such a way, interface detection need not be performed in regions, where it already has been performed. The level at which the pipette tip was at an end of a previous detection movement may be stored in a controller and/or device performing the method automatically.

According to an embodiment of the invention, the pipette tip is lowered to a level, which is a safety distance away from the level at which the detection movement was stopped. The safety distance may be chosen, such that the pipette tip is in a volume where the first liquid medium is. When the path of the pipette tip is from the top to the bottom of the container, the pipette tip may return to a point above the level at which the interface detection was stopped.

According to an embodiment of the invention, the safety distance is chosen, such that the pressure during aspiration in the pipette stabilizes to a pressure with constant slope until the level, at which the previous detection movement was stopped, has been reached. In such a way it is ensured that an accurate slope detection can be performed, even if the liquid level in the sample container almost has reached the interface. A pressure with constant slope may be a pressure with a pressure curve over time, which does not substantially deviate from a straight line. For example, noise may be disregarded.

According to an embodiment of the invention, the pipette has an elongated nozzle, which has a diameter along the extension of the nozzle, which varies at least 10% from a mean diameter of the nozzle. The nozzle may be formed like a tube. The diameter of the nozzle may substantially be constant or the nozzle may have a constant diameter. It also may be that the diameter of the nozzle increases from the pipette tip along the nozzle. With such a nozzle, the viscous friction between the pipette and the liquid medium may be adjusted to values suitable for performing the method and in particular the interface detection. Furthermore, the discarding of the second liquid medium may be simplified, since a laminar flow is created in the substantially tube-like nozzle.

A further aspect of the invention relates to a computer program for aspirating a first liquid medium from two liquid media, which computer program, when being executed by a processor, is adapted to carry out the steps of the method as described above and below. The computer program may be executed in a computing device, such as a controller of the laboratory automation device and/or a PC, which may be communicatively interconnected with the laboratory automation device. It also is possible that the method is performed by an embedded microcontroller of the laboratory automation device.

A further aspect of the invention relates to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet and/or a cloud storage, which allows downloading a program code. In general, the computer-readable medium may be a non-transitory or transitory medium.

A further aspect of the invention relates to a laboratory automation device.

According to an embodiment of the invention, the laboratory automation device comprises a pipetting arm for carrying a pipette; a device for changing a pressure in a volume connected to the pipette for aspirating and dispensing a liquid medium in the pipette; a pressure sensor for pressure measurements in the volume connected to the pipette and a control device for controlling the device and the pipetting arm and for receiving a pressure signal from the pressure sensor, wherein the control device is adapted for performing the method as described above and below.

It has to be understood that features of the method as described in the above and in the following may be features of the control device, the computer program and the computer-readable medium as described in the above and in the following and vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
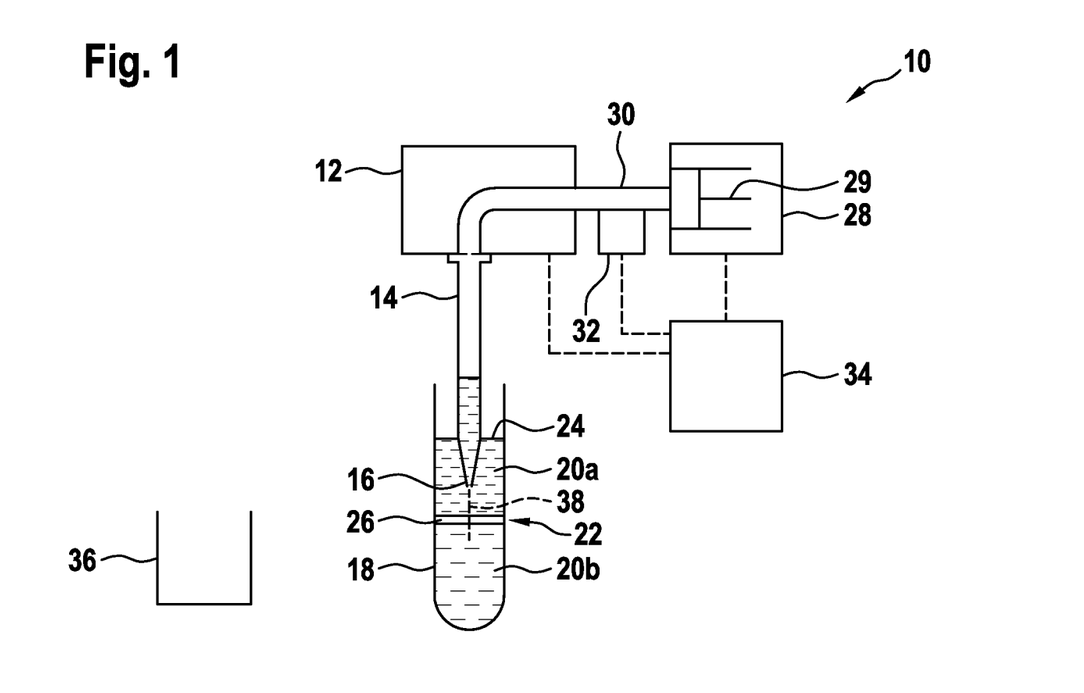
FIG. 1 schematically shows a laboratory automation device according to an embodiment of the invention.

FIG. 1 schematically shows a laboratory automation device 10, which comprises an automatically movable pipetting arm 12 to which a pipette 14 is attached. As shown in FIG. 1, the pipette tip 16 of the pipette 14 may be lowered into a sample container 18 via the movable pipetting arm 12. For example, the container 18 may be a test tube with a centrifuged blood sample.

The pipetting arm 12 may move the pipette 14 and the pipette tip 16 in three dimensions, may lower the pipette tip 16 into the sample container 18 and may retract the pipette tip 16 therefrom.

In the sample container 18, liquid media 20a, 20b are contained, which have a different density and which separate themselves in a vertical direction, for example under gravity or centrifugal forces. The two liquid media 20a, 20b are separated by an interface 22. The interface 22 may be seen as a layer or plane between the liquid media 20a, 20b. It has to be noted that there is a second interface 24, which is present between the liquid media 20a and the air of the environment.

For example, the first liquid media 20a may be blood plasma and the second liquid media 20b may contain blood cells, such as red and white blood cells. As shown in FIG. 1, the red and white blood cells also may be separated from each other and the white blood cells may form a small layer 26 between the plasma and the red blood cells. This layer 26 may be seen as a part of the interface 22.

As a further example, the two liquid media 20a, 20b may be two unmixable liquids, which are used for liquid-liquid extraction.

The laboratory automation system 10 furthermore comprises a pump 28, which is connected via a hose 30 with the pipette 14. With the pump 28, a pressure may be applied to the hose 30 and to the pipette 14, which causes the pipette 14 to aspirate or dispense a liquid medium 20a, 20b or any other fluid. For example, the pump 28 comprises a plunger 29, which is moved for generating underpressure and overpressure in the hose 30 and the pipette 14.

A pressure sensor 32, which may be attached to the hose 30 and/or the pipette 14, is adapted for measuring a pressure in the hose 30 and/or the pipette 14.

A control device 34 of the laboratory automation device 10, which may be a part of the laboratory automation device 10 or connected thereto, may control the pipetting arm 12, the pump 28 and may receive a pressure signal from the pressure sensor 32.

In general, liquid may be aspirated from the sample container 18 with the pipette 14 by generating an underpressure in the pipette 14, wherein the first liquid medium 20a of the two liquid media is aspirated and after the interface 22 and the pipette tip 16 pass each other, the second liquid medium 20b of the two liquid media is aspirated. A pressure in the pipette 14 is measured with the pressure sensor 32, while the pipette tip 16 and the interface 22 move with respect to each other and the position of the interface 22 is detected, when a slope of the pressure changes.

FIG. 1 also shows a further sample container 36 into which the first liquid medium 20a will be dispensed as described below.

Figure 2:
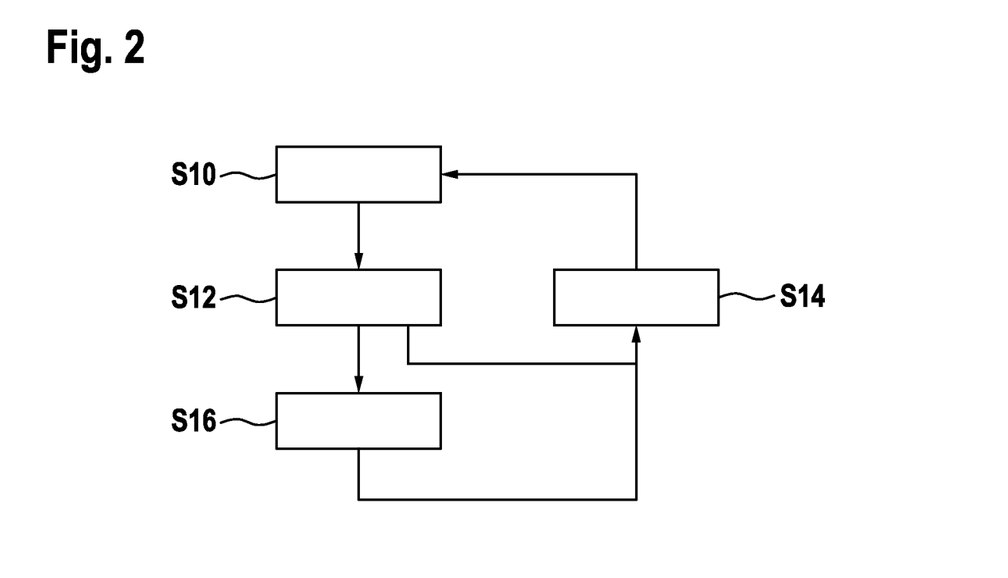
FIG. 2 shows a flow diagram for a method for aspirating a liquid medium according to an embodiment of the invention.

FIG. 2 shows a flow diagram for aspirating the first liquid medium 20a and for transporting the first liquid medium 20a into the further sample container 36. The method may be performed by the laboratory automation device 10 controlled by the control device 34.

In step S10, the pipette tip 16 is moved into the container 18 and lowered into the container 18, until the liquid level 24 being the boundary between the first liquid medium 20a and air is reached. The liquid level 24 may be detected with a capacitive method. After that, the pipette tip 16 is moved in the sample container 18 along at least a part of a path 38 intersecting the interface 22 between the first liquid medium 20a and the second liquid medium 20b. As shown, the pipette tip 16 may be moved along a vertical direction, however, more complicated paths 38 are possible, which may have components in a horizontal direction and/or inclined sections.

In step S12, when the pipette tip is immersed in the first liquid 20a, liquid is aspirated from the sample container 18 with the pipette 14 by generating an underpressure in the pipette 14 with the pump 28. The first liquid medium 20a is then aspirated, when the pipette tip 16 is above the interface 22, and after passing the interface 22, when the pipette tip 16 is below the interface 22, the second liquid medium 20b is aspirated by the pipette tip 16.

However, with the method it may be tried to aspirate as less second liquid medium 20b as possible, as for example described below.

In step S12, the amount of first liquid medium 20a in the pipette 14 is estimated, which may be determined from the volume rate of the pump 28. When a aspiration volume of the pipette 14 has been filled, the method continues in step S14, where the content of the pipette is dispensed into the second sample container 36.

Also during step S12, the pressure sensor 32 measures a pressure signal 40 (see FIG. 4) in the pipette 14, while the pipette tip 16 is moved. When the position of the interface 22 is detected by evaluating a slope of the pressure signal 40, the method continues in step S16.

Otherwise, the method continuous in step S14, where the pipette 14 is withdrawn from the sample container 18 and the first liquid medium 20a in the pipette 14 is dispensed into the further sample container 36.

After that, the method continues in step S12, where again the pipette tip 16 is lowered into the sample container 18. For example, blood samples usually have a volume of 9 mL or 6 mL, where the plasma content is 53-59%, a usual pipette 14 will be full before reaching the interface 22.

Again, the air-liquid interface, i.e. the level 24, may be detected, for example with a capacitive method. After the first filling of the pipette 14, the plasma is dispensed into the container 36 and the pipette 14 can aspirate more plasma. This may be repeated until the interface 22 to the red blood cells is reached.

In step S16, a post-detection procedure may be performed, when the interface 22 has been detected. In particular, after the detection of the interface 22, the pipette 14 may be withdrawn from the sample container 18 and/or an amount of liquid from the pipette 14 may be dispensed such that an aspirated amount of second liquid medium 20b and if desired a fraction of the first liquid medium 20a is discarded.

After step S16, the method may continue with dispensing the first liquid medium 20a in the pipette 14 into the further sample container 36 and may stop afterwards. It also may be that the pipette 14 moves back to the first liquid container 18 and aspirates the remaining amount of the first liquid medium 20a with interface detection. This is possible since the position 22 of the interface position is now known.

Figure 3:
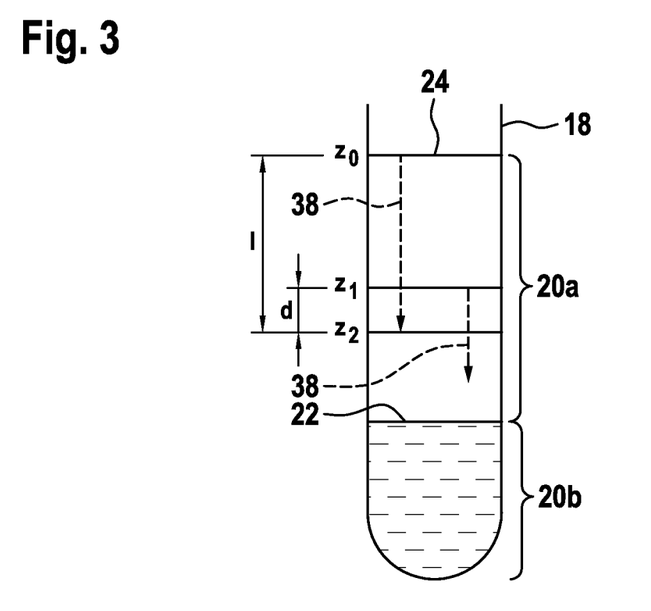
FIG. 3 shows a sample container illustrating a repeated aspiration process used during an embodiment of the invention.

In FIG. 3, the movement path 38 of the pipette tip 16 during step S12 is shown, when liquid is aspirated. In a first pass, the pipette tip 16 is moved from a level $z_0$, where the liquid level is at the starting time, for a lowering distance l to the level $z_2$, where the pipette 14 has been filled up or is filled to its aspiration volume. The movement from $z_0$ to $z_2$, may be done rather fast and/or with a speed, such that the aspirated liquid medium 20a, 20b is enough for interface detection. At $z_2$, when no interface 22 has been detected, the movement may be stopped and first liquid medium 20a may be aspirated until the pipette 14 is filled up to the aspiration volume.

It also may be that before the pipette 14 is filled up to the aspiration volume, the pipette tip is retracted for a safety distance d from the level $z_2$ to the level $z_1$ and that there, the pipette 14 is filled up to the aspiration volume.

During the second pass and optionally all subsequent passes, the pipette tip 16 in the sample container 18 may be lowered to a level at which the pipette tip 16 was at an end of a previous detection movement. The pipette tip 16 also may be lowered to a level $z_1$, which is a safety distance d above the level $z_2$ at which the previous detection movement was stopped. The benefit of the safety distance d will be described with respect to the following figures. The retraction safety distance after the distance I is reached may be different from the lowering safety distance, which is used during again lowering the pipette into the container.

Figure 4:
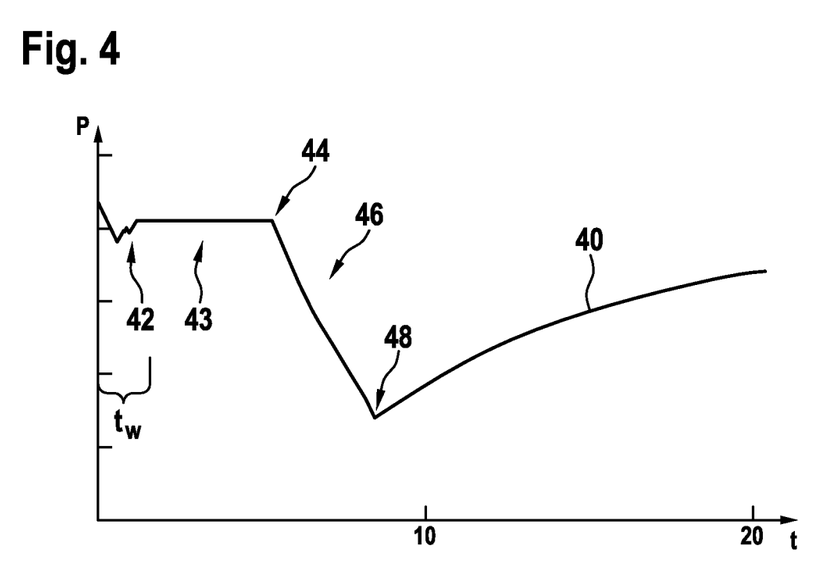
FIG. 4 shows a diagram with a pressure over time generated during a method according to an embodiment of the invention.

FIG. 4 shows a diagram with a pressure signal or pressure curve 40, which has been recorded during a movement of the pipette tip 16 through the interface 22. For example, the pressure 40 shown in FIG. 4 may be the one as the last detection movement performed in step S12, when in the end, the interface 22 is detected.

FIG. 4 is an example of a pressure signal 40, which was recorded during aspiration of blood plasma, when entering from the plasma into the erythrocytes. When the pipette tip 16 goes through the interface 22, the slope of the pressure 40 changes.

In particular, the diagram shows the time t on the horizontal axis and pressure p on the vertical axis. At time t=0, the underpressure is generated and in a first time interval 42, the first liquid medium 20a starts to enter the pipette tip 16. In this time interval 42, the pressure 40 varies, since the flow in the pipette tip 16 has not yet stabilized. After the stabilization phase in the time interval 43, the slope of the pressure 40 is constant. The volume rate of the pump 28 has been adjusted to the amount of first liquid medium 20a flowing into the pipette 14. At point 44, the pipette tip 16 enters the second liquid medium 20b, which is more viscous as the first liquid medium 20a and in the following time interval 46, the slope of the pressure 40 changes (it deceases). This slope change is detected by the controller 34, which then stops the pump 28 and the movement of the pipette tip 16. After the stop of the pump 28, the pressure starts to increase again.

Due to the first time interval 42, it may be beneficial to introduce a waiting time $t_w$ after starting the pump 28, before the interface detection 22 becomes active, to ignore the pressure change when the first liquid medium 20 starts to enter into the empty pipette tip 16. Furthermore, it may be beneficial to stop the z-movement of the pipette tip 16 and the pump 28 upon interface detection to avoid aspiration of a large amount of the second liquid medium 20b and to minimize a contamination risk.

To ensure that the blind phase defined by the waiting time $t_w$ takes place in a safety distance d it follows that $v_z \cdot t_w < d$, where $v_z$ is the z-axis speed of the pipette tip 16. Furthermore, the speed vi of the liquid level should be smaller than the speed $v_z$ of the pipette tip 16. It has to be noted that $v_z$ may only be the z-component of the speed of the pipette tip 16 and that speed of the pipette tip 16 also may have components in another direction.

This results in an upper and lower boundary for the speed $v_z$ of the pipette tip 16 during detection movement $$v_l < v_z < d/t_w$$

FIG. 5A to 5D show diagrams indicating the z-coordinate respectively the level 50 of the pipette tip 16 and the liquid level 52 in the sample container 18 during lowering and retreating the pipette 14 in the sample container 18 in different scenarios.

The diagrams all start at time $t_0$, where it has been detected that the pipette tip 16 has touched the liquid level 24 in the sample container 18 and the pump 28 is started.

Figure 5A:
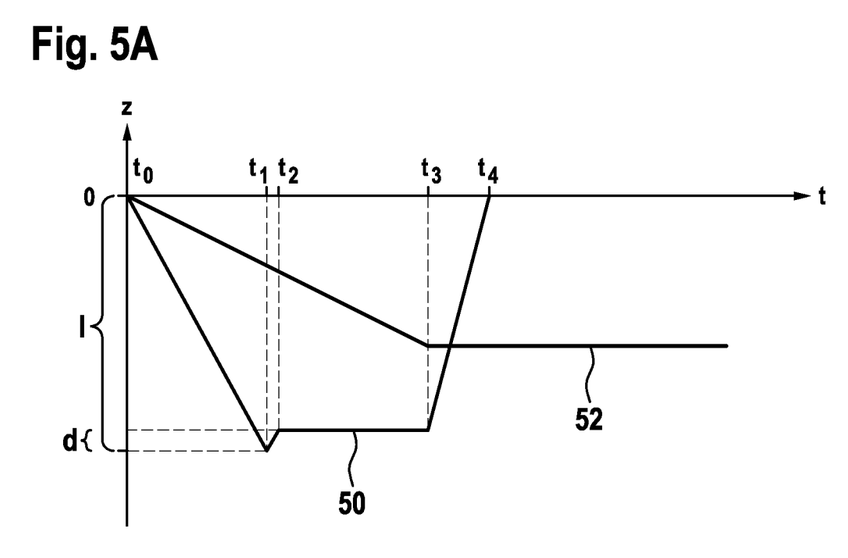
FIG. 5A to 5D show diagrams with pipette tip positions and liquid levels over time generated during a method according to an embodiment of the invention.
Figure 5B:
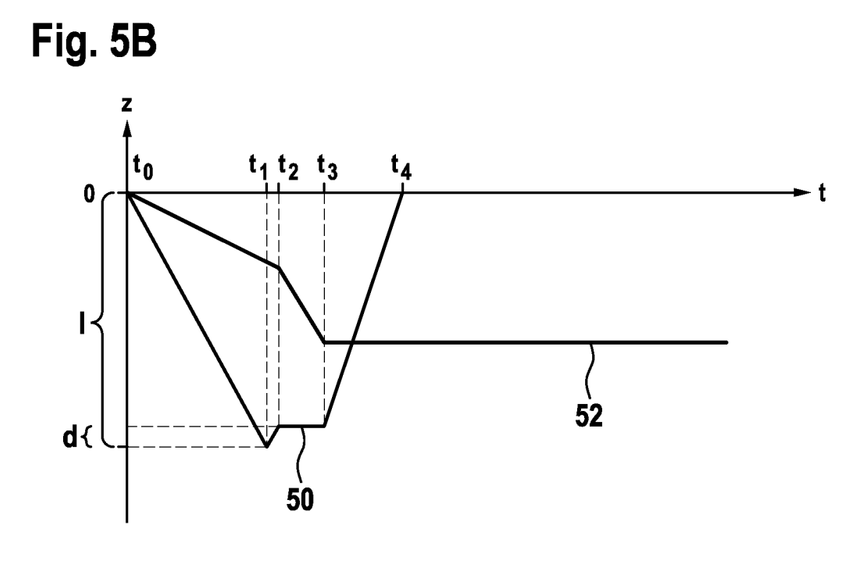

In FIG. 5A and 5B, the pipette 16 is lowered into the sample container 18 with a constant speed for the distance I until a time $t_1$ is reached. During this movement interface detection is performed. In FIG. 5A and 5B no interface is detected.

The pipette 16 is withdrawn by a safety distanced and stopped there. Then the rest of the aspiration volume is aspirated until a time $t_3$. Afterwards, the pipette is completely removed from the sample container 18 and dispensed in the further sample container 36.

In FIG. 5A, the liquid medium 20a is aspirated with a constant aspiration rate between the times $t_0$ and $t_3$. The liquid level 52 drops with a constant rate between these two time points.

In FIG. 5B, the liquid medium 20a is aspirated with a first aspiration rate during the lowering of the pipette 14 between $t_0$ and $t_2$. This first aspiration rate is lower than a second aspiration rate between $t_2$ and $t_3$, where the rest of the aspiration volume of the liquid medium 20a is aspirated.

Figure 5C:
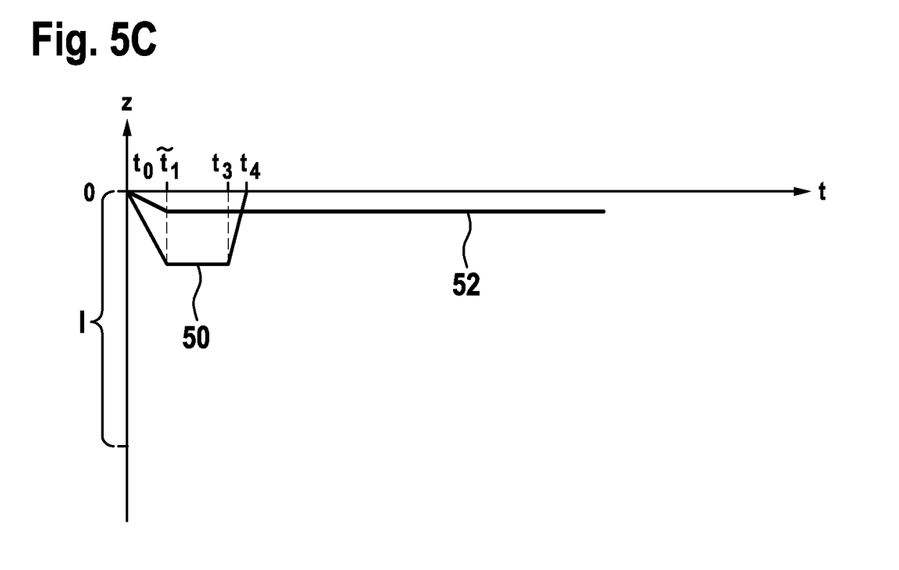
Figure 5D:
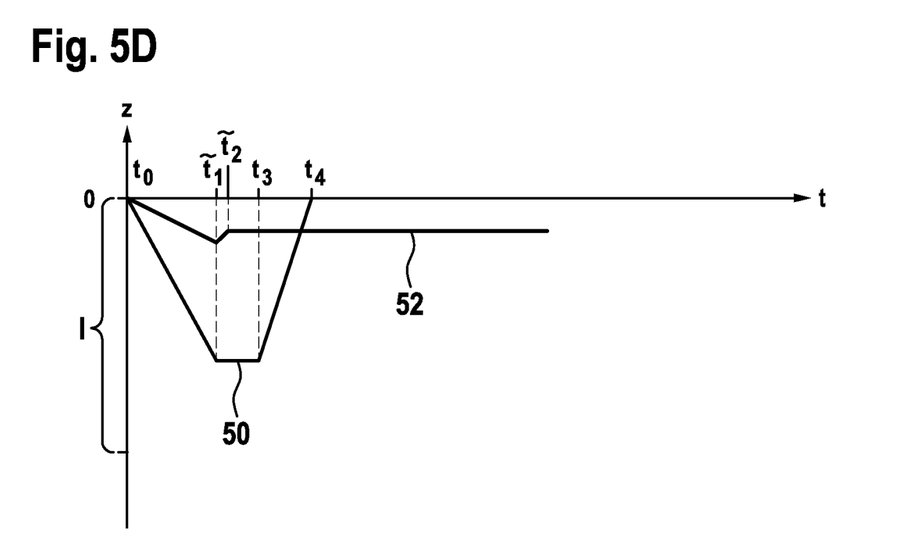

FIG. 5C and 5D show scenarios, where the interface 22 is detected at a time $\tilde{t}_t$, before the pipette 14 has been moved for the distance I.

In FIG. 5C, the pipette 14 is then stopped and withdrawn from the sample container 18. After that the aspirated amount of the second liquid medium 20b may be discarded by dispensing a small content of the pipette 14. The remaining content may be dispensed in the further sample container 36. It also may be that then the complete content of the pipette 14 is discarded.

In FIG. 5D, after the interface detection at time $\tilde{t}_1$ an amount of the content of the pipette 14 is dispensed until time $\tilde{t}_2$. This dispensing is done at the level, where the interface has been detected. After that the pipette 14 is withdrawn from the sample container 18 and, for example, may be dispensed into the further sample container 36.

Figure 6:
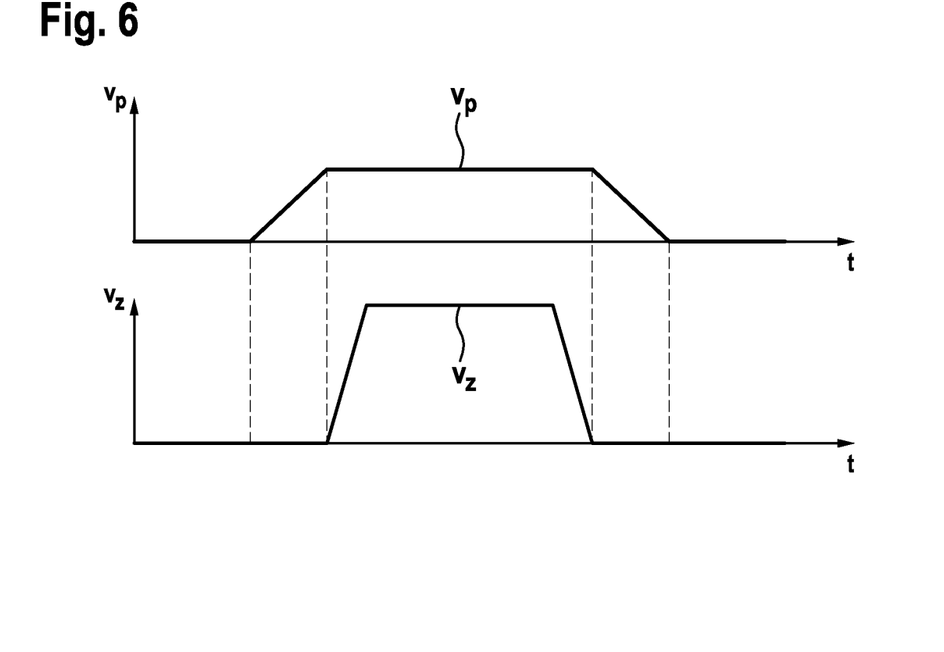
FIG. 6 shows a diagram with a pipette tip and pump speeds generated during a method according to an embodiment of the invention.

In the detection movements of FIG. 5A to 5D, an aspiration rate of the aspirated liquid medium 20a has been adjusted, such that a movement speed of the liquid level 52 in the sample container 18 is slower than a movement speed of the pipette tip 16.

aspiration FIG. 6 shows a diagram with a speed/volume rate $v_p$ of the pump 28, which may be proportional to the speed of the plunger 29 and a speed $v_z$ of the pipette tip. Both quantities are depicted over time t.

To improve the interface detection, the pipette tip 16 solely moves when the pump 28 has a constant speed and/or volume rate $v_p$. If the pump 28 is in an acceleration or deceleration phase, then the interface detection may be more difficult and/or not so accurate. It may be that the pipette tip 16 is solely moved, when a pump 28 generating the underpressure operates at a constant volume rate $v_p$. When the pump 28 comprises a plunger 29, the pipette 14 may be solely moved, when the plunger 29 is moved with constant speed $v_p$.

Figure 7:
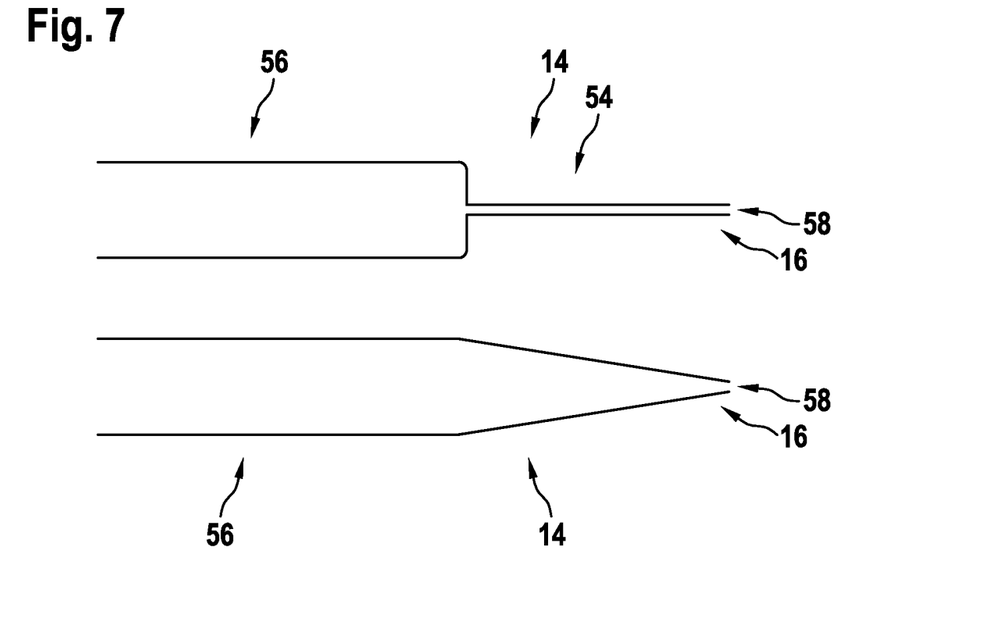
FIG. 7 shows pipettes, which may be used in a method according to an embodiment of the invention.

FIG. 7 schematically shows two tip designs for pipettes 14, which may be used in the laboratory automation device 10, when the method is performed. The upper pipette 14 has an elongated nozzle 54 with a diameter along the extension of the nozzle, which varies at least 10% from a mean diameter of the nozzle 54. The mean diameter of the nozzle 54 may be smaller than the mean diameter of the rest of the pipette, i.e. the pipette body 56, for example more than 3 times. An elongated nozzle 54 may be beneficial in washing dispensing (see description of step S16) the undesired second liquid medium 20b from the pipette tip 16.

The lower pipette 14 has a conical pipette tip with a small orifice 58, which, for example, may have a diameter of less than 10% of a diameter of the pipette body 56. A smaller orifice 58 may allow to have a higher sensitivity and trigger a faster stop when the pipette tip 16 enters into the second liquid medium 20b.

Also the upper pipette 14 with the nozzle 54 may have such a small orifice 58.

After the interface detection, there usually is an amount of second liquid medium 20b in the pipette tip 16. The amount of second liquid medium 20b may be calculated from the pressure-time curve with the knowledge of the aspiration speed. For better washing of the second liquid medium 20b, for example in a nozzle 54, an additional amount of first liquid medium 20a may be dispensed.

After interface detection, an under-pressure may exist within the pipette 14. Therefore, a further amount of second liquid medium 20b may flow inside the pipette tip, although the pump 28 has been stopped. This may be minimized by reversing the operation of the pump 28 directly after interface detection and/or switching to dispense instead of only stopping the movement. After detection of the interface 22, the pipette tip 16 may be stopped at the detected position and an overpressure may be generated in the pipette 14 to dispense an amount of the second aspirated liquid medium 20b from the pipette 14.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit, such as an FPGA, may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for aspirating a first liquid medium of two liquid media of different density from a first sample container, wherein an interface separates the two liquid media, the method performed by a laboratory automation device and comprising:

calculating, by the laboratory automation device, a lowering distance, wherein the lowering distance is lower than a top surface of the first liquid medium in the sample container and the lowering distance is based on an aspiration volume;

lowering a pipette of the laboratory automation device into the first sample container until a pipette tip of the pipette has passed the lowering distance;

aspirating the first liquid medium from the sample container during the lowering of the pipette by generating an underpressure in the pipette by the laboratory automation device, wherein the first liquid medium is aspirated, and after the interface and the pipette tip pass each other, a second liquid medium of the two liquid media is aspirated; and measuring a pressure in the pipette with a pressure sensor of the laboratory automation device during the lowering of the pipette and detecting a position of the interface using a pressure analysis during the lowering of the pipette;

when the lowering distance has been passed and no interface is detected, stopping the lowering of the pipette by the laboratory automation device, aspirating the aspiration volume from the first liquid medium and dispensing the aspiration volume of the first liquid medium into a second sample container by generating an overpressure in the pipette by the laboratory automation device.

2. The method of claim 1,
when the aspiration volume of the first liquid medium has been dispensed into the further second sample container, repeating of:
lowering of the pipette for the lowering distance until the pipette tip of the pipette has passed the lowering distance from a liquid level changed due to the previous aspiration of the first liquid medium in the sample container, and detecting for a position of the interface, and when the interface is not and, when no interface is detected, aspirating the aspiration volume.

3. The method of claim 1,
wherein, when the lowering distance has been passed and no interface is detected, retracting the pipette for a safety distance such that the pipetting tip remains in a volume of the first liquid medium before aspirating the aspiration volume.

4. The method of claim 1,
wherein, when the lowering distance has been passed and no interface is detected, stopping the pipette before the aspiration volume is aspirated.

5. The method of claim 1,
wherein a first aspiration rate during the lowering of the pipette for the lowering distance is lower than a second aspiration rate, after the pipette tip has been lowered below the lowering distance.

6. The method of claim 1,
wherein an aspiration rate during lowering of the pipette is adjusted, such that a movement speed of a liquid level in the sample container is slower than a movement speed of the pipette tip;
wherein the movement speed of the pipette tip is at least 10% faster than the movement speed of the liquid level.

7. The method of claim 1,
wherein the pipette tip is solely moved, when a device generating the underpressure or the overpressure in a volume connected to the pipette operates at a constant volume rate.

8. The method of claim 7,
wherein the device comprises a plunger moveable in a hose and the pipette is solely moved, when the plunger is moved with constant speed.

9. The method of claim 1,
after detection of the position of the interface, withdrawing the pipette from the sample container and discarding an amount of liquid from the pipette such that an aspirated amount of second liquid medium is discarded into a waste container.

10. The method of claim 1,
after detection of the position of the interface, stopping the pipette tip at the detected position and generating the overpressure to dispense an amount of the second aspirated liquid medium and/or an amount of the first aspirated liquid medium from the pipette.

11. The method of claim 1, further comprising:
after the aspiration volume of the first liquid medium has been dispensed into the second sample container, lowering the pipette tip in the sample container to a level at which the pipette tip was at an end of a previous aspiration movement, i and from this level continuing lowering the pipette into the sample container until the pipette tip has passed the lowering distance.

12. The method of claim 11,
wherein the pipette tip is lowered to a level, which is a safety distance above the level at which the pipette tip was at an end of a previous aspiration movement.

* * * * *